Patented Dec. 25, 1923.

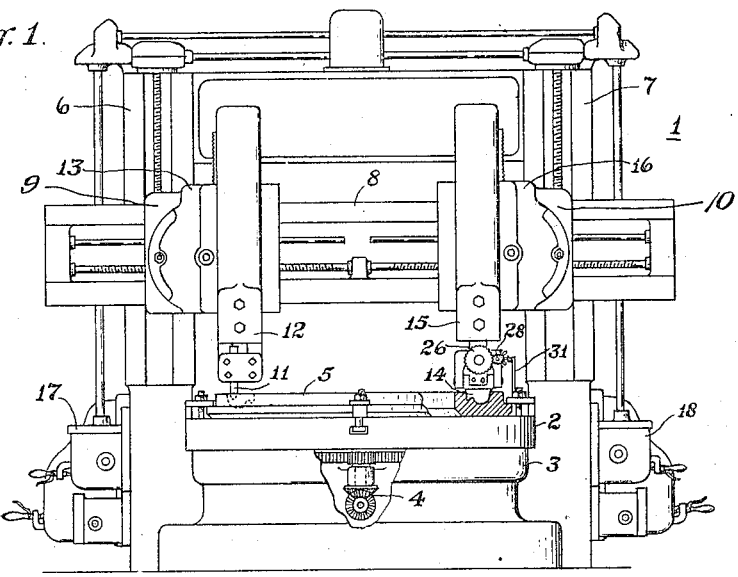
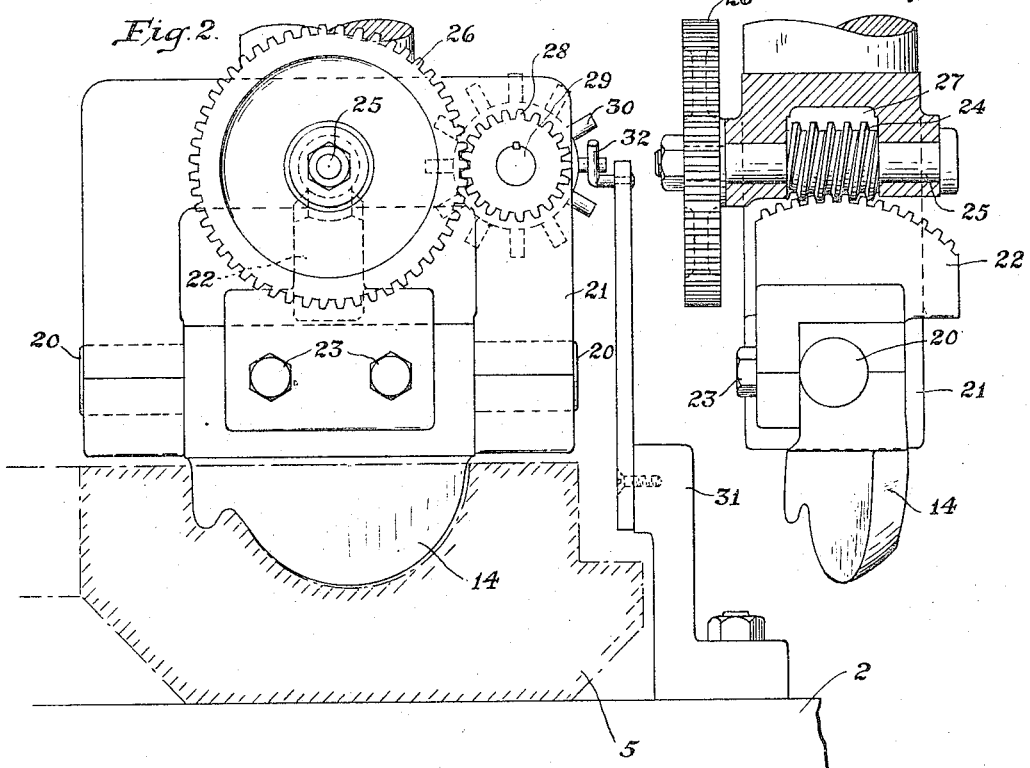

1,478,686

UNITED STATES PATENT OFFICE.

SPENCER JAY TELLER, OF HARTFORD, CONNECTICUT, ASSIGNOR TO PRATT & WHITNEY COMPANY, OF NEW YORK, N. Y., A CORPORATION OF NEW JERSEY.

METAL-CUTTING MACHINE.

Application filed May 3, 1921. Serial No. 466,580.

*To all whom it may concern:*

Be it known that I, SPENCER JAY TELLER, a citizen of the United States, residing at Hartford, in the county of Hartford and State of Connecticut, have invented certain new and useful Improvements in a Metal-Cutting Machine, of which the following is a specification.

My invention relates to a metal cutting machine for shaping a piece of work such as a mold and particularly to a machine for shaping molds for automobile tires.

One object of my invention is to provide a machine for forming a mold for tires and other articles that shall be simple and efficient in forming the members of the mold to any predetermined contour and that shall effect a finishing operation on the mold in a simple manner by means of a tool having a helical cutting edge which effects a scraping shearing cut.

Another object of my invention is to provide means that shall form a mold from a rough casting or member by facing the member, by roughly gouging out the member to the predetermined form that is to be molded, and by effecting a final shearing cut on the member with a tool having a helical cutting edge which is adapted to cut the predetermined form that is to be molded.

In molding tires and similar articles it is customary practice to provide two members which are formed to the shape of the article that is to be molded and a third member which serves as a core member. The two similar members which are shaped to the form of the article that is to be molded are generally formed in a boring mill by an operation that is not suited for shaping members that are adapted to mold relatively large articles. According to modern practice each of the two similar members after being faced and roughly gouged out to the form of the article to be molded are subjected to a finishing operation by means of a tool that has a form corresponding to the article which is to be molded. The finishing tool has a width equal to the size of the article that is to be molded and in the case of automobile tires has a width equal to the diameter of the cross section of the finished tire. When the width of the finishing tool becomes relatively large trouble is experienced in taking the finishing cut across the complete width of the finishing tool.

In forming a mold in accordance with my invention each member of the mold is faced in any suitable manner preparatory to shaping the member in accordance with the article that is to be molded. The member is roughly gouged out to the shape of the article that is to be molded in any suitable manner and preferably by means of a boring mill. Finally a finishing shearing cut is made on the member in a machine which is preferably a boring mill. The shearing cut is preferably effected by means of a tool which is provided with a helical cutting edge. The finishing tool is given a slow movement of rotation independent of the movement of the boring mill table in order to effect a cut across the face of the casting. The tool is preferably given a movement of rotation in accordance with the rotation of the boring mill table. Thus the finishing cut on the casting is effected by a tool which effects a shearing cut in such manner as not to subject it to extreme stresses and strains as would be effected by the formed tools now utilized.

In practicing my invention, the cutting tool which effects the finishing operation is preferably given a movement of rotation about an axis which is disposed perpendicularly or angularly to the axis of rotation of the work. Such movement of the finishing tool permits the effecting of a scraping shearing cut during the finishing operation. Moreover, a progressive shearing cut is effected which insures a smooth even finishing surface and the tool is not subjected to the severe strain of the finishing tools when operated in accordance with modern methods. Furthermore, it is preferable to relieve the finishing tool along lines conforming to spirals which are maintained in similar relationship as they extend backward and inward. Thus it is possible to sharpen or grind the teeth of the tool on the front cutting face without changing the effective contour. The movement of rotation of the finishing tool is preferably controlled in accordance with the rotation of the work being operated on.

Although my invention is exemplified by means of a machine wherein the mold or piece of work is rotated while in engagement with the cutting tool, it is apparent the piece of work may effect other movements while in engagement with the cutting tool. Moreover, although a mold is referred to in describing and claiming my invention, it is to be understood that such term is used generically and is intended to cover any similar piece of work.

In the accompanying drawing:

Figure 1 is a diagrammatic front-elevational view of a machine tool adapted to form a mold in accordance with my invention.

Figs. 2 and 3 are detailed views of a formed tool which is adapted to effect a finishing cut in accordance with my invention.

Referring to the drawing and particularly Fig. 1, a vertical boring mill 1 is shown having a revolving table 2 which is mounted on a base 3. The table 2 is rotatably mounted upon the base member in any suitable manner and is rotated by means of a gearing system 4. A mold 5 is shown clamped to the table 2 and in this case the mold is shown as a mold for automobile tires.

Two upright guides 6 and 7 are provided for supporting a cross rail 8. The cross rail 8 supports two saddles 9 and 10 which respectively support the roughing and finishing tools. A gouging or roughing tool 11 of any convenient type is mounted on a slide 12 which in turn is supported on a table 13. The table 13 is rotatably supported on the saddle 9. A finishing tool 14 is mounted on a slide 15 in a manner to be hereinafter set forth. The slide 15 is mounted on a table 16 which is supported on the saddle 10.

Speed boxes 17 and 18 are provided for respectively controlling the movement of the roughing and the finishing tools. Any convenient means may be utilized for effecting vertical movement of the cross rail 8 on the slides 6 and 7. Inasmuch as my invention is not directed particularly to a machine tool or to a vertical boring mill but to a method of forming a mold, a complete description of the machine which is utilized in practicing my invention is deemed unnecessary. Moreover, such machine tools are old and well known in the art.

Referring to Figs. 2 and 3 of the drawing, the finishing tool 14, which is adapted to cut the predetermined form that is to be molded, is provided with a helicoidal cutting face having an axis coinciding with the axis of rotation of the tool. The cutting face of the tool 14 is relieved along lines conforming to spirals which are maintained in similar relationship as they extend backward. Thus, it is possible to sharpen or grind the teeth of the tool on the front cutting edge without changing the effective contour. The tool 14 is provided with trunnions 20 which are supported in a yoke or bifurcated member 21. The yoke member 21 is rigidly supported in the slide 15 in any convenient manner. A segment 22 of a worm gear wheel is attached to the finishing tool 14 by means of bolts 23 as shown in Figs. 2 and 3 of the drawing. The worm wheel segment 22 meshes with a worm member 24 which is mounted on a worm shaft 25. The worm shaft 25 is supported on the yoke member 21 and carries a spur gear wheel 26 which is located outside and adjacent to the yoke member. The worm wheel segment 22 is located between the end portions of the yoke or bifurcated member, and the worm member 24 is located within a recess 27 formed in the yoke member. The spur gear wheel 26 meshes with a pinion 28 which is mounted on a stud shaft 29 extending from the yoke member 21. The shaft 29 also carries a star wheel 30 for a purpose to be hereinafter set forth.

An arm 31 is bolted or attached to the rotating table 2 in any convenient manner so as not to interfere with the work or mold 5. Such arm 31 is provided with an inclined plane member 32 which projects from the side of the arm 31 in such a manner as to effect movement of the star wheel 30 in accordance with the rotation of the work table 2. The projection extending from the side of the arm 31 engages the prongs of the star wheel successively during the rotation of the table and by such means effects a movement of rotation of the gear wheels 28 and 26 and of the finishing tool 14.

Assuming the mold 5 and the table 2 to rotate in a counter-clockwise direction, the tool 14 is given a movement of rotation on the trunnions 20 in a clockwise direction. In this regard it should be noted the tool 14 is rotated on an axis which is angularly disposed with respect to the axis of rotation of the mold 5 and the table 2. By providing a helicoidal cutting face on the tool 14 only a small portion of the cutting face of the tool is in engagement with the mold at a time and consequently the tool is not subjected to the stresses and strain of the tools now in service which effect a cut equivalent to their width. Moreover, the rotative movement of the tool 14 effects a scraping shearing cut which produces a highly finished surface.

In producing or forming a mold in accordance with my invention, the mold is first faced in any suitable manner and preferably by means of the roughing tool in a vertical boring mill as shown in the drawing. After the facing operation, the mold is roughly gouged out to the predetermined form that is to be molded. The roughing operation is preferably effected in a vertical boring mill such as illustrated in the drawing. Upon completion of the roughing operation, the roughing tool 11 is disengaged from the work and the finishing tool 14 is moved into engagement with the mold for effecting a finishing cut. The helical cutting tool 14 is adapted to cut the form which is to be molded and is given a movement of rotation by means of the projecting arm 31 in the manner heretofore set forth.

It is to be understood that such changes and modifications may be made in my invention as fall within the limits of the appended claims.

What I claim is:

1. In a metal cutting machine, the combination comprising a tool having a helicoidal front cutting face, the outline of the cutting face being such that a predetermined contour is described on an axial plane when the tool is rotated on its helicoidal axis, means for moving a piece of work in engagement with and relative to the tool, the axis of the helicoid on the tool being located in a plane parallel to the plane of movement of the work, and means for effecting a slow movement of rotation of the tool on the axis of the helicoidal cutting face so that a different portion on the edge of the cutting face is in engagement with the work at each successive movement.

2. In a metal cutting machine, the combination comprising a tool having a helicoidal front cutting face, the outline of the cutting face being such that a predetermined contour is described on an axial plane when the tool is rotated on its helicoidal axis, means for effecting repeated rotations of the work, the axis of the helicoidal cutting face being angularly disposed with respect to the axis of rotation of the work, and means for effecting a slow movement of rotation of the tool so that a different portion of the edge of the cutting face is in engagement with the work at each successive rotation thereof.

3. In a metal cutting machine, the combination comprising a tool having a helicoidal front cutting face, the outline of the cutting face being such that a predetermined contour is described on an axial plane when the tool is rotated on its helicodidal axis, means for effecting repeated rotations of the work in engagement with the tool, the axis of the work being located perpendicularly to the helicoidal axis of the tool, and means for effecting a slow movement of rotation of the tool so that a different portion of the edge of the cutting face is in engagement with the work at each successive rotation thereof.

4. In a metal cutting machine for shaping a piece of work to a predetermined form, the combination comprising means for rotating the work, means for roughly shaping the piece of work to the desired form, a form tool having a helicoidal cutting face, and automatic means for giving such form tool a movement of rotation in timed relation to the rotation of the work.

5. In a metal cutting machine for shaping a piece of work to a predetermined form, the combination comprising means for rotating the piece of work, a form cutting tool having a helicoidal cutting face, and means for giving the form cutting tool a slow movement of rotation on an axis located in a plane substantially perpendicular to the axis of rotation of the work while in engagement with the rotating piece of work.

6. In a metal cutting machine for shaping a piece of work to a predetermined form, the combination comprising means for rotating the work, a form cutting tool having a helicoidal cutting face which is so shaped as to cut the predetermined form, and automatic means for effecting an independent movement of rotation of the form cutting tool in accordance with the rotation of the work while being held in engagement with the work.

7. In a metal cutting machine for shaping a piece of work to a predetermined form, the combination comprising means for rotating the work, a form tool having a helicoidal front cutting face, and means for effecting a slow movement of rotation of the form tool on an axis located in a plane angularly disposed to the axis of rotation of the work while being held in engagement with the rotating work.

8. In a metal cutting machine for shaping a piece of work to any desired form, the combination comprising means for rotating the piece of work, a form cutting tool having a helicoidal front cutting face, means for effecting relative rotation between the work and the formed cutting tool, and means for independently rotating the form cutting tool on the axis of its helicoidal face while being held in engagement with the rotating work, the tool being rotated in timed relation to the relative rotation between the work and tool.

9. In a metal cutting machine for shaping a piece of work to a predetermined form, the combination comprising means for rotating the work, means for roughly shaping the rotating work to the predetermined form, a form cutting tool having a helicoidal front cutting face which is adapted to cut the predetermined form, and automatic means for effecting a slow movement of rotation of the form cutting tool in timed relation to the rotating work.

10. In a metal cutting machine for shaping a piece of work to a predetermined form, the combination comprising means for rotating the piece of work, a form cutting tool having a helicoidal front cutting face which is so shaped as to cut the predetermined form, the axis of the helicoid making an angle with the axis of rotation of the work, and automatic means for giving the form cutting tool an independent movement of rotation in accordance with the rotation of the work while being held in engagement with the work.

11. In a machine for shaping a piece of work to a predetermined form, the combination comprising a table carrying the piece of work which is to be cut to the predetermined form, a tool provided with a helicoidal cutting face adapted to cut the predetermined form, means for rotatably mounting the tool on the axis of the helicoid, means for effecting relative movement of the tool and the table so that each portion of one member is moved repeatedly past the other member, and means for giving the tool a movement of rotation on its helicoidal axis so as to effect a shearing cut on the work, the tool being moved in timed relation to the relative movement between the tool and the table.

12. In a machine for shaping a piece of work to a predetermined form, the combination comprising a table carrying the piece of work to be formed, a tool provided with a helicoidal cutting face adapted to cut the predetermined form, means for rotatably mounting the tool on the axis of the helicoid, means for moving each portion of the work repeatedly past the tool, and means for giving the tool a movement of rotation on its helicoidal axis in accordance with the movement of the work.

13. In a machine for shaping a piece of work to a predetermined form, the combination comprising a rotating table carrying the piece of work to be formed, a tool provided with a helicoidal cutting face adapted to cut the predetermined form, means for rotatably mounting the tool on the axis of the helicoid, and means for giving the tool a movement of rotation on its helicoidal axis in accordance with the rotation of the work.

14. In a machine for shaping a piece of work to a predetermined form, the combination with a table carrying the work to be shaped, means for rotating the table, a cross rail supported above the rotating table, and a tool provided with a helicoidal cutting face adapted to cut the predetermined form and movable with said rail to engage the piece of work, of means for rotatably supporting the tool on the axis of the helicoid, and means comprising an arm projecting from the table for effecting rotative movement of the tool on the helicoidal axis in accordance with the rotation of the table.

15. In a machine for shaping a piece of work to a predetermined form, the combination with a table carrying the work to be shaped, means for rotating the table, a roughing and a finishing tool, and a cross rail for supporting the tools above the work, of means for moving either the roughing or the finishing tool into engagement with the work, said finishing tool being provided with a helicoidal cutting face adapted to cut the predetermined form, means for rotatably supporting the finishing tool on the helicoidal axis, a gearing system connected to the finishing tool, and means comprising an arm projecting from the table for operating said gearing system in accordance with the rotation of the table to effect a movement of rotation of the finishing tool.

16. A tool for cutting a contour other than a straight line, comprising a rectangular body portion having a single helicoidal cutting face adapted to cut the predetermined contour, the outer surface of the tool behind the helicoidal cutting face being relieved along lines extending backward and inward from the outer cutting edge of the face in definite relation to each other, and means for pivotally supporting the tool along the axis of the helicoid.

17. A tool for cutting a predetermined contour, comprising a substantially rectangular body portion, a helicoidal front cutting face, means for pivotally supporting the tool on the axis of the helicoid, and a relieved surface on the end of the tool conforming to spirals constructed about the axis of the helicoid.

In testimony whereof, I hereto affix my signature.

S. JAY TELLER.